US012767844B2

(12) United States Patent
Hayashi et al.

(10) Patent No.: US 12,767,844 B2
(45) Date of Patent: Oct. 20, 2026

(54) INK SET FOR TEXTILE PRINTING AND METHOD FOR PRODUCING PRINTED TEXTILE ITEM

(71) Applicant: RISO KAGAKU CORPORATION, Tokyo (JP)

(72) Inventors: Akiko Hayashi, Tokyo (JP); Tetsuya Shiraishi, Tokyo (JP); Takahisa Yamazaki, Tokyo (JP); Ryo Shinotsuka, Tokyo (JP); Takumi Matsuda, Tokyo (JP); Kokoro Kinoe, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 544 days.

(21) Appl. No.: 18/349,342

(22) Filed: Jul. 10, 2023

(65) Prior Publication Data

US 2024/0018377 A1 Jan. 18, 2024

(30) Foreign Application Priority Data

Jul. 12, 2022 (JP) ................................. 2022-111961

(51) Int. Cl.

| | |
|---|---|
| ***C09D 11/40*** | (2014.01) |
| ***B41J 3/407*** | (2006.01) |
| ***C09D 11/023*** | (2014.01) |
| ***C09D 11/037*** | (2014.01) |
| ***C09D 11/102*** | (2014.01) |
| ***C09D 11/107*** | (2014.01) |
| ***C09D 11/322*** | (2014.01) |
| ***C09D 11/38*** | (2014.01) |
| ***C09D 11/54*** | (2014.01) |
| ***D06P 1/52*** | (2006.01) |
| ***D06P 1/92*** | (2006.01) |
| ***D06P 5/00*** | (2006.01) |
| ***D06P 5/30*** | (2006.01) |

(52) U.S. Cl.

CPC ............. *C09D 11/40* (2013.01); *B41J 3/4078* (2013.01); *C09D 11/023* (2013.01); *C09D 11/037* (2013.01); *C09D 11/102* (2013.01); *C09D 11/107* (2013.01); *C09D 11/322* (2013.01); *C09D 11/38* (2013.01); *C09D 11/54* (2013.01); *D06P 1/525* (2013.01); *D06P 1/5285* (2013.01); *D06P 1/928* (2013.01); *D06P 5/001* (2013.01); *D06P 5/002* (2013.01); *D06P 5/30* (2013.01)

(58) Field of Classification Search

CPC ..... C09D 11/40; C09D 11/023; C09D 11/037; C09D 11/102; C09D 11/107; C09D 11/322; C09D 11/38; C09D 11/54; B41J 3/4078; D06P 1/525; D06P 1/5285; D06P 1/928; D06P 5/001; D06P 5/002; D06P 5/30; D06P 1/44; D06P 1/52; D06P 1/5257

See application file for complete search history.

(56) References Cited

U.S. PATENT DOCUMENTS

| | | | | |
|---|---|---|---|---|
| 8,328,340 B2 | 12/2012 | Ogawa et al. | | |
| 2006/0117994 A1* | 6/2006 | Ryu | C09D 11/38 | 106/31.77 |
| 2020/0048488 A1* | 2/2020 | Wilson | C09D 11/40 | |
| 2020/0123701 A1* | 4/2020 | Okada | D06P 1/445 | |

FOREIGN PATENT DOCUMENTS

| | | |
|---|---|---|
| JP | 2009-030014 | 2/2009 |
| JP | 4839504 B2 * | 12/2011 |

OTHER PUBLICATIONS

English machine translation of JP-4839504-B2 (Year: 2011).*

* cited by examiner

*Primary Examiner* — Amber R Orlando
*Assistant Examiner* — Jeffrey Eugene Barzach
(74) *Attorney, Agent, or Firm* — HSML P.C.

(57) ABSTRACT

Disclosed is an ink set for textile printing including: a pretreatment liquid that contains a polyvalent metal salt, a water-soluble organic solvent, and a surfactant; a white inkjet ink that contains a white pigment, resin particles, and a water-soluble organic solvent; and a non-white inkjet ink that contains a non-white pigment, resin particles, a water-soluble organic solvent, and a surfactant. Also disclosed is a method for producing a printed textile item.

18 Claims, No Drawings

INK SET FOR TEXTILE PRINTING AND METHOD FOR PRODUCING PRINTED TEXTILE ITEM

CROSS REFERENCE TO RELATED APPLICATIONS

This application is based upon and claims the benefit of priority from the prior Japanese Patent Application No. 2022-111961, filed on Jul. 12, 2022, the entire contents of which are incorporated by reference herein.

BACKGROUND OF THE INVENTION

Field of the Invention

Embodiments of the present invention relate to an ink set for textile printing and a method for producing a printed textile item.

Description of the Related Art

Among the various methods for printing images such as text, pictures, or designs onto fabrics such as woven fabrics, knitted fabrics, and nonwoven fabrics, in addition to screen textile printing methods and roller textile printing methods, inkjet textile printing methods are now attracting considerable attention.

Compared with an image formed on a light colored fabric such as a white fabric, an image formed on a dark colored fabric such as a black fabric tends to be less visible. JP 2009-30014 A discloses a method in which a pretreatment agent containing a polyvalent metal salt is applied to a dark colored fabric such as a black fabric, then an ink containing a white pigment is applied thereon to form a white image, and a desired image is formed thereon. Further, J P 2009-30014 A discloses that a heat treatment is performed after the pretreatment agent is applied.

SUMMARY OF THE INVENTION

An embodiment of the present invention relates to an ink set for textile printing including: a pretreatment liquid that contains a polyvalent metal salt, a water-soluble organic solvent, and a surfactant; a white inkjet ink that contains a white pigment, resin particles, and a water-soluble organic solvent; and a non-white inkjet ink that contains a non-white pigment, resin particles, a water-soluble organic solvent, and a surfactant, in which when a surface tension of the pretreatment liquid is termed X, a surface tension of the white inkjet ink is termed Y, a surface tension of the non-white inkjet ink is termed Z1, and a surface tension of a liquid having a composition in which the surfactant is excluded from the non-white inkjet ink is termed Z2, formula 1, formula 2, and formula 3 shown below are satisfied.

$$33\ mN/m \leq X \leq 50\ mN/m \quad \text{(Formula 1)}$$

$$-5\ mN/m \leq Y - Z1 \leq 10\ mN/m \quad \text{(Formula 2)}$$

$$0\ mN/m \leq Z2 - Z1 \leq 10\ mN/m \quad \text{(Formula 3)}$$

Another embodiment of the present invention relates to a method for producing a printed textile item including: applying a pretreatment liquid to a fabric; applying a white inkjet ink using an inkjet method to the fabric to which the pretreatment liquid has been applied; and applying a non-white inkjet ink using an inkjet method to the fabric to which the white inkjet ink has been applied, in which the pretreatment liquid contains a polyvalent metal salt, a water-soluble organic solvent, and a surfactant, the white inkjet ink contains a white pigment, resin particles, and a water-soluble organic solvent, the non-white inkjet ink contains a non-white pigment, resin particles, a water-soluble organic solvent, and a surfactant, and when a surface tension of the pretreatment liquid is X, a surface tension of the white inkjet ink is Y, a surface tension of the non-white inkjet ink is Z1, and a surface tension of a liquid having a composition in which the surfactant is excluded from the non-white inkjet ink is Z2, formula 1, formula 2, and formula 3 below are satisfied.

$$33\ mN/m \leq X \leq 50\ mN/m \quad \text{(Formula 1)}$$

$$-5\ mN/m \leq Y - Z1 \leq 10\ mN/m \quad \text{(Formula 2)}$$

$$0\ mN/m \leq Z2 - Z1 \leq 10\ mN/m \quad \text{(Formula 3)}$$

DETAILED DESCRIPTION OF THE EMBODIMENTS

Embodiments of the present invention will be described in detail below, but it is needless to say that the present invention is not limited to these embodiments and various modifications and alterations are possible.

<Ink Set for Textile Printing>

Suppose that a pretreatment liquid containing an aggregating agent is adhered to a dark colored fabric, then a white ink is to applied to the substrate to form a white image using what is referred to as a wet-on-wet method without providing a drying step, and then a non-white ink is applied to form a non-white image. In the above case, sufficient color development properties may not be obtained in the non-white image.

An ink set for textile printing of one embodiment is an ink set for textile printing including: a pretreatment liquid that contains a polyvalent metal salt, a water-soluble organic solvent, and a surfactant; a white inkjet ink that contains a white pigment, resin particles, and a water-soluble organic solvent; and a non-white inkjet ink that contains a non-white pigment, resin particles, a water-soluble organic solvent, and a surfactant, in which when a surface tension of the pretreatment liquid is termed X, a surface tension of the white inkjet ink is termed Y, a surface tension of the non-white inkjet ink is termed Z1, and a surface tension of a liquid having a composition in which the surfactant is excluded from the non-white inkjet ink is termed Z2, formula 1, formula 2, and formula 3 shown below are satisfied.

$$33\ mN/m \leq X \leq 50\ mN/m \quad \text{(Formula 1)}$$

$$-5\ mN/m \leq Y - Z1 \leq 10\ mN/m \quad \text{(Formula 2)}$$

$$0\ mN/m \leq Z2 - Z1 \leq 10\ mN/m \quad \text{(Formula 3)}$$

When this ink set for textile printing is used, it is possible to form a non-white image with excellent color development properties. In particular, even when printing is performed on a dark colored fabric using a wet-on-wet method, it is possible to form a non-white image with excellent color development properties.

In the following descriptions, an ink set for textile printing is sometimes referred to simply as an ink set. A white inkjet ink is sometimes referred to simply as a white ink. Further, a non-white inkjet ink is sometimes referred to simply as non-white ink.

Although not bound by any specific theory, it is considered that an ink set of one embodiment may act as follows.

If a white image with excellent color development properties can be formed, a non-white image formed thereon tends to have good color development properties.

If a pretreatment liquid penetrates into the inside of a fabric, the amount of aggregating agent on the surface of the fabric decreases. However, if the surface tension (X) of the pretreatment liquid is 33 mN/m or more, it is difficult for the pretreatment liquid to penetrate into the inside of the fabric. Accordingly, the decrease in the amount of aggregating agent on the surface of the fabric and the resulting decrease in the reactivity between the white ink and the aggregating agent can be suppressed, and the color development properties of the white image can be enhanced.

If the surface tension (X) of the pretreatment liquid is 50 mN/m or less, the pretreatment liquid is easy to level on the surface of the fabric after it lands on the fabric. Therefore, the uniformity of the white image can be enhanced, and this can enhance the color development properties of the white image.

Suppose that the surface tension (Y) of the white ink and the surface tension (Z1) of the non-white ink satisfy $Y-Z1 \leq 10$ mN/m. In the above case, wet spreading of the non-white ink on the white image is easily suppressed, and even when a pressurized heat drying step such as heat pressing is performed, it is difficult for the non-white ink and the white ink to mix, and the color development properties of the non-white ink can be enhanced.

If dots of the non-white ink become small, the color development properties of the non-white ink image tend to decrease due to the exposure of the white image of the underlayer. When $-5$ mN/m$\leq Y-Z1$ is satisfied, the dots of the non-white ink are unlikely to become smaller, and the color development properties of the non-white ink image can be enhanced.

If the non-white ink is applied based on a wet-on-wet method while the pretreatment liquid and the white ink are not fully dried, the dots of the non-white ink overlap each other on a coating film which has a relatively large amount of residual liquid and thus has fluidity. If heat drying is performed under this condition using a heat press or the like, the color development properties of the dried non-white image may decrease. This may be because the surfactant capability of the surfactant in the non-white ink decreases due to heat, the dots of the non-white ink shrink, and the underlying white image is exposed. Such a decrease in the surfactant capability of the surfactant tends to occur particularly with a nonionic surfactant. Suppose that the surface tension (Z1) of the non-white ink and the surface tension (Z2) of the liquid having a composition in which the surfactant is excluded from the non-white ink satisfy $Z2-Z1 \leq 10$ mN/m, that is, the difference in the surface tension between the presence and absence of the surfactant is 10 mN/m or less. In the above case, the effect of the decrease in the surfactant capability of the surfactant on the surface tension may be small, and in the case of the wet-on-wet method, the color development properties of the non-white image after heating and drying by heat pressing or the like can be made favorable.

The ink set for textile printing of one embodiment includes a pretreatment liquid containing a polyvalent metal salt, a water-soluble organic solvent, and a surfactant, a white inkjet ink containing a white pigment, resin particles, and a water-soluble organic solvent, and a non-white inkjet ink containing a non-white pigment, resin particles, a water-soluble organic solvent, and a surfactant. The ink set for textile printing may contain two or more non-white inkjet inks, for example. The ink set for textile printing may further contain a post-treatment liquid or the like.

The pretreatment liquid, white inkjet ink, and non-white inkjet ink will be described below.

<Pretreatment Liquid>

The pretreatment liquid may contain a polyvalent metal salt as an aggregating agent.

A polyvalent metal salt generally tends to be highly reactive and, with relatively a small amount of a polyvalent metal salt, it is possible to favorably aggregate white ink colorants on a substrate. Therefore, if a polyvalent metal salt is used, it is possible to reduce the application amount of a pretreatment liquid. If the application amount of a pretreatment liquid is large, it tends to hinder the penetration and drying of the white ink and non-white ink, and the amount of liquid on the surface of printed matter increases, making it easier for the fluidity of the ink layer to be maintained. Therefore, disturbance in the size and shape of dots of these inks is likely to occur, and color development properties are likely to decrease.

Polyvalent metal salts are composed of a divalent or higher polyvalent metal ion and an anion. Examples of a divalent or higher polyvalent metal ion include $Ca^{2+}$, $Mg^{2+}$, $Cu^{2+}$, $Ni^{2+}$, $Zn^{2+}$, $Ba^{2+}$, and the like. Examples of an anion include $Cl^-$, $NO_3^-$, $CH_3COO^-$, $I^-$, $Br^-$, $SO_4^{2-}$, $ClO_3^-$, and the like. Specific examples of polyvalent metal salts include calcium chloride, calcium nitrate, magnesium nitrate, magnesium sulfate, copper nitrate, calcium acetate, magnesium acetate, and the like. Polyvalent metal salts may be hydrates or anhydrides.

One of these polyvalent metal salts may be used alone or a combination of two or more may be used.

The amount of the polyvalent metal salt in terms of the active component amount, relative to the total mass of the pretreatment liquid, is preferably 10% by mass or more, more preferably 15% by mass or more, and even more preferably 20% by mass or more. The amount of the polyvalent metal salt in terms of the active component amount, relative to the total mass of the pretreatment liquid, is preferably 50% by mass or less, more preferably 45% by mass or less, and even more preferably 40% by mass or less. The amount of the polyvalent metal salt in terms of the active component amount, relative to the total mass of the pretreatment liquid, is preferably within a range from 10 to 50% by mass, more preferably from 15 to 45% by mass, and even more preferably from 20 to 40% by mass.

In those cases where a metal salt hydrate is used as the polyvalent metal salt, the amount of active component of the polyvalent metal salt refers to the equivalent amount of the anhydrous salt.

The pretreatment liquid preferably contains a water-soluble organic solvent. An organic compound that is liquid at room temperature and can be dissolved in water can be used as the water-soluble organic solvent. The use of a water-soluble organic solvent that mixes uniformly with an equal volume of water at 1 atmosphere and 20° C. is preferred. Examples of water-soluble organic solvents that may be used include lower alcohols such as methanol, ethanol, 1-propanol, isopropanol, 1-butanol, 2-butanol, isobutanol, and 2-methyl-2-propanol; glycols such as ethylene glycol, diethylene glycol, triethylene glycol, tetraethylene glycol, polyethylene glycol, propylene glycol, 1,3-propanediol, dipropylene glycol, tripropylene glycol, and polypropylene glycol; glycerols such as glycerol, diglycerol, triglycerol, and polyglycerol; acetins such as monoacetin and diacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; and triethanolamine, 1-methyl-2-pyrrolidone, 1,3-dimethyl-2-imidazolidinone, β-thiodiglycol, and sulfolane. The boiling point of the water-soluble organic solvent is preferably at least 100° C., and more preferably at least 150° C.

One of these water-soluble organic solvents may be used alone, or a combination of two or more water-soluble organic solvents may be used provided the solvents form a single phase with water. The amount of the water-soluble organic solvent relative to the total mass of the pretreatment liquid is preferably within a range from 1 to 50% by mass, more preferably from 5 to 40% by mass, and even more preferably from 10 to 30% by mass.

The pretreatment liquid preferably contains a surfactant. Examples of surfactants that may be used include anionic surfactants, cationic surfactants, amphoteric surfactants, and nonionic surfactants. Two or more thereof may be used in combination. Among these surfactants, nonionic surfactants are particularly preferred. The surfactant may be, for example, a low-molecular weight surfactant or a high-molecular weight surfactant.

The HLB value of the surfactant is preferably within a range from 5 to 20 and more preferably from 10 to 18.

Examples of the nonionic surfactants include ester-based surfactants such as glycerol fatty acid esters and fatty acid sorbitan esters; ether-based surfactants such as polyoxyethylene alkyl ethers, polyoxyethylene alkylphenyl ethers, and polyoxypropylene alkyl ethers; ether ester-based surfactants such as polyoxyethylene sorbitan fatty acid esters; acetylene-based surfactants; silicone-based surfactants; and fluorine-based surfactants. Among these, acetylene-based surfactants such as acetylene glycol-based surfactants can be used particularly favorably.

Examples of the acetylene-based surfactants include acetylene glycol-based surfactants, acetylene alcohol-based surfactants, and surfactants having an acetylene group.

Acetylene glycol-based surfactants are glycols having an acetylene group, are preferably glycols having a left-right symmetrical structure with an acetylene group in the center, and may include a structure in which ethylene oxide has been added to acetylene glycol.

Examples of commercially available products of acetylene-based surfactants include the SURFYNOL series of products such as "SURFYNOL 104E", "SURFYNOL 104H", "SURFYNOL 420", "SURFYNOL 440", "SURFYNOL 465", and "SURFYNOL 485" manufactured by Evonik Industries AG, and the OLFINE series of products such as "OLFINE E1004", "OLFINE E1010", and "OLFINE E1020" manufactured by Nissin Chemical Industry Co., Ltd. (wherein all of the above are product names).

Examples of the silicone-based surfactants include polyether-modified silicone-based surfactants, alkyl-aralkyl-comodified silicone-based surfactants, and acrylic silicone-based surfactants.

Examples of commercially available products of silicone-based surfactants include "SILFACE SAG002" and "SILFACE SAG503A" manufactured by Nissin Chemical Industry Co., Ltd. (wherein both of the above are product names).

Further examples of other nonionic surfactants include polyoxyethylene alkyl ether-based surfactants such as the EMULGEN series of products including "EMULGEN 102KG", "EMULGEN 103", "EMULGEN 104P", "EMULGEN 105", "EMULGEN 106", "EMULGEN 108", "EMULGEN 120", "EMULGEN 147", "EMULGEN 150", "EMULGEN 220", "EMULGEN 350", "EMULGEN 404", "EMULGEN 420", "EMULGEN 705", "EMULGEN 707", "EMULGEN 709", "EMULGEN 1108", "EMULGEN 4085", and "EMULGEN 2025G" manufactured by Kao Corporation (wherein all of the above are product names).

Examples of the anionic surfactants include the EMAL series of products such as "EMAL 0", "EMAL 10", "EMAL 2F", "EMAL 40", and "EMAL 20C", the NEOPELEX series of products such as "NEOPELEX GS", "NEOPELEX G-15", "NEOPELEX G-25", and "NEOPELEX G-65", the PELEX series of products such as "PELEX OT-P", "PELEX TR", "PELEX CS", "PELEX TA", "PELEX SS-L", and "PELEX SS-H", and the DEMOL series of products such as "DEMOL N", "DEMOL NL", "DEMOL RN", and "DEMOL MS", all manufactured by Kao Corporation (wherein all of the above are product names).

Examples of the cationic surfactants include the ACETAMIN series of products such as "ACETAMIN 24" and "ACETAMIN 86", the QUARTAMIN series of products such as "QUARTAMIN 24P", "QUARTAMIN 86P", "QUARTAMIN 60W", and "QUARTAMIN 86W", and the SANISOL series of products such as "SANISOL C" and "SANISOL B-50", all manufactured by Kao Corporation (wherein all of the above are product names).

Examples of the amphoteric surfactants include the AMPHITOL series of products such as "AMPHITOL 20BS", "AMPHITOL 24B", "AMPHITOL 86B", "AMPHITOL 20YB", and "AMPHITOL 20N" manufactured by Kao Corporation (wherein all of the above are product names).

One of the above surfactants may be used alone, but a combination of two or more surfactants may also be used.

The amount of the surfactant relative to the total mass of the pretreatment liquid is preferably within a range from 0.01 to 10% by mass, more preferably from 0.1 to 5% by mass, and even more preferably from 0.2 to 3% by mass.

The pretreatment liquid may contain one or more other components if necessary. Examples of these other components include water, antifoaming agents, pH adjusters, antioxidants, preservatives, and the like.

There are no particular limitations on the water but water containing as few ionic components as possible is preferred. Examples of the water include ion-exchanged water, distilled water, ultrapure water, and the like.

The amount of water relative to the total mass of the pretreatment liquid is preferably within a range from 20 to 80% by mass, more preferably from 30 to 70% by mass, and even more preferably from 40 to 60% by mass.

There are no particular limitations on the method used for producing the pretreatment liquid, and production may be performed using appropriate conventional methods. For example, the pretreatment liquid may be obtained by using a stirring device such as a three-one motor to disperse all of the components, either in a single batch or in a number of separate batches, and then passing the dispersion through a filtration device such as a membrane filter if desired.

The pH of the pretreatment liquid is preferably within a range from 3 to 9 and more preferably from 4 to 8. The viscosity of the pretreatment liquid at 23° C. is preferably within a range from 1 to 30 mPa·s.

From the viewpoint of good color development properties of the white image and thereby good color development properties of the non-white image, it is preferable that the following formula 1 be satisfied when the surface tension of the pretreatment liquid is termed X.

$$33\ mN/m \leq X \leq 50\ mN/m \quad \text{(Formula 1)}$$

From the viewpoint of good color development properties of the white image and thereby good color development properties of the non-white image, X is preferably 33 mN/m or more, more preferably 34 mN/m or more, and even more preferably 35 mN/m or more. From the viewpoint of good color development properties of the white image and thereby good color development properties of the non-white images, X is preferably 50 mN/m or less, more preferably 45 mN/m or less, and even more preferably 40 mN/m or less. X is preferably within a range from 33 mN/m to 50 mN/m, more preferably from 34 mN/m to 45 mN/m, and even more preferably from 35 mN/m to 40 mN/m.

The surface tension of the pretreatment liquid can be controlled by means of, for example, the type and amount of the surfactant, water-soluble organic solvent, and the like.

In the present specification, the surface tension is the dynamic surface tension at a frequency of 0.05 Hz, and is the value at 23° C. The surface tension can be determined under the measurement conditions of 23° C. and 0.05 Hz according to a bubble pressure method (maximum bubble pressure method). For the measurement, for example, the Science Line t60 device manufactured by SITA Process Solutions of SITA Messtechnik GmbH can be used.

The pretreatment liquid can be preferably used for textile printing. The method of applying the pretreatment liquid is not particularly limited, but it is preferable to apply the pretreatment liquid using an inkjet method.

<White Inkjet Ink>

The white inkjet ink may contain a white pigment as a colorant.

Examples of the white pigment include inorganic pigments such as titanium oxide, zinc oxide, zinc sulfide, antimony oxide, and zirconium oxide. Examples of the white pigment further include hollow resin microparticles and polymer microparticles. Among the various possibilities, from the viewpoint of the concealment properties, the use of titanium oxide is preferred. The average particle size of the titanium oxide is preferably at least 100 nm from the viewpoint of the concealment properties, and is preferably not more than 600 nm from the viewpoint of the jetting stability. In those cases where titanium oxide is used, in order to suppress any photocatalytic action, the use of titanium oxide that has been surface treated with alumina or silica is preferred. The surface treatment amount is preferably within a range from 5 to 20% by mass of the pigment.

A self-dispersing pigment may be used as the white pigment. A self-dispersing pigment is a pigment in which a hydrophilic functional group has been introduced to the pigment surface by a chemical treatment or a physical treatment. The hydrophilic functional group introduced into the self-dispersing pigment will be described later.

As the white pigment, a pigment dispersion containing a pigment that has already been dispersed using a pigment dispersant may also be used. A pigment dispersion containing a pigment that has been dispersed using a pigment dispersant described later may be used.

One white pigment may be used alone or a combination of two or more white pigments may be used.

From the viewpoint of concealment properties and the like, the amount of the white pigment relative to the total mass of the white inkjet ink is preferably within a range from 1 to 30% by mass, more preferably from 3 to 20% by mass, and even more preferably from 5 to 15% by mass.

In order to disperse the white pigment stably in the white inkjet ink, a pigment dispersant typified by polymer dispersants and surfactant-type dispersants can be used.

Examples of commercially available products of polymer dispersants include the TEGO Dispers series of products such as "TEGO Dispers 740W", "TEGO Dispers 750W", "TEGO Dispers 755W", "TEGO Dispers 757W", and "TEGO Dispers 760W" manufactured by Evonik Industries AG, the Solsperse series of products such as "Solsperse 20000", "Solsperse 27000", "Solsperse 41000", "Solsperse 41090", "Solsperse 43000", "Solsperse 44000", and "Solsperse 46000" manufactured by The Lubrizol Corporation, the Joncryl series of products such as "Joncryl 57", "Joncryl 60", "Joncryl 62", "Joncryl 63", "Joncryl 71", and "Joncryl 501" manufactured by BASF Japan Ltd., "DISPERBYK-102", "DISPERBYK-185", "DISPERBYK-190", "DISPERBYK-193", and "DISPERBYK-199" manufactured by BYK-Chemie Japan K.K., and "Polyvinylpyrrolidone K-30" and "Polyvinylpyrrolidone K-90" manufactured by DKS Co., Ltd. (wherein all of the above are product names).

Examples of the surfactant-type dispersants include anionic surfactants, including the DEMOL series of products such as "DEMOL P", "DEMOL EP", "DEMOL N", "DEMOL RN", "DEMOL NL", "DEMOL RNL", and "DEMOL T-45" manufactured by Kao Corporation, and nonionic surfactants including the EMULGEN series of products such as "EMULGEN A-60", "EMULGEN A-90", "EMULGEN A-500", "EMULGEN B-40", "EMULGEN L-40", and "EMULGEN 420" manufactured by Kao Corporation (wherein all of the above are product names).

One pigment dispersant may be used alone or a combination of two or more pigment dispersants may be used.

When used, there are no particular limitations on the amount of the pigment dispersant in the white inkjet ink, which may vary depending on the type of pigment dispersant used, but generally the amount of the pigment dispersant, expressed as a mass ratio of the active component relative to a value of 1 for the pigment, is preferably within a range from 0.005 to 0.5.

The white inkjet ink can contain resin particles.

It is preferable that the resin particles can be dispersed in an aqueous solvent. It is preferable that the resin particles can be dispersed in water without being dissolved in the water and form an oil-in-water (O/W) type emulsion.

The resin particles can be blended as an oil-in-water resin emulsion in the production of the white inkjet ink.

The resin particles may be self-emulsifying resin particles in which hydrophilic groups and/or hydrophilic segments are introduced in the resin for stable dispersion in water, or forced emulsifying resin particles in which the resin is forcibly dispersed by using a dispersant.

The resin particles may be anionic, cationic, nonionic, or amphoteric, for example, but are preferably anionic or nonionic.

The anionic resin particles may be a resin in which anionic functional groups of the resin are located on the resin particle surfaces, as in the case of a self-emulsifying resin, or may be a resin that has been subjected to a surface treatment by, for example, adhering an anionic dispersant to the resin particle surfaces. Examples of typical anionic functional groups include carboxyl groups, sulfo groups, sulfino groups, sulfuric acid ester groups, phosphoric acid groups, phosphoric acid ester groups, phosphorous acid groups, phosphorous acid ester groups, and the like. Examples of anionic dispersants include anion surfactants and the like.

The nonionic resin particles may be resin particles in which nonionic functional groups of the resin are located on the resin particle surfaces, as in the case of a self-emulsifying resin, or may be resin particles that have been subjected to a surface treatment by, for example, adhering a nonionic dispersant to the resin particle surfaces. Examples of typical nonionic functional groups include polyoxyalkylene glycol groups and hydroxyl groups. Examples of the nonionic dispersant include nonionic surfactants and the like.

The average particle size of the resin particles is preferably 600 nm or less, more preferably 300 nm or less, and even more preferably 200 nm or less from the viewpoint of the inkjet jetting characteristics. The average particle size of the resin particles may be in the range from 10 nm to 600 nm, may be in the range from 50 nm to 300 nm, and may be in the range from 50 nm to 200 nm, for example.

In the present specification, the average particle size of the resin particles is an average particle size measured on a volume basis by means of a dynamic light scattering method.

As the type of resin particles, it is preferable to use a resin that forms a transparent coating film.

Examples of the resin of the resin particles include: conjugated diene-based resins such as styrene-butadiene copolymers, methyl methacrylate-butadiene copolymers, and vinyl chloride-vinyl acetate copolymers; acrylic-based resins such as polymers of any one or more selected from the group consisting of acrylic acid esters and methacrylic acid esters, and copolymers of any one or more selected from the group consisting of acrylic acid esters and methacrylic acid esters with styrene or the like; vinyl-based resins such as ethylene-vinyl acetate copolymers; functional group-modified resins based in which any of these resins has been modified with a monomer containing a functional group such as a carboxyl group; melamine resins; urea resins; polyurethane resins (sometimes referred to as “urethane resin”); polyester resins; polyolefin resins; silicone resins; polyvinyl butyral resins; and alkyd resins. Resin particles containing one of these resins may be used but hybrid resin particles may also be used.

The resin particles preferably contain acrylic-based resin particles, urethane resin particles, or a combination thereof.

A polyurethane resin may be either an aliphatic polyurethane resin or an aromatic polyurethane resin. Examples of polyurethane resins include ether-based polyurethane resins, ester-based polyurethane resins, ester/ether-based polyurethane resins, carbonate-based polyurethane, and the like.

Examples of commercially available products of emulsions of resin particles include “SUPERFLEX 460”, “SUPERFLEX 470”, “SUPERFLEX 740”, and “SUPERFLEX 150” manufactured by. DKS Co., Ltd., and “Mowinyl 6763” and “Mowinyl 6718” manufactured by Japan Coating Resin Corporation (wherein all of the above are product names).

One type of resin particles may be used alone, or a combination of two or more types of resin particles may be used.

The amount of resin particles relative to the total mass of white inkjet ink is preferably 5% by mass or more, more preferably 8% by mass or more, even more preferably 10% by mass or more, and still even more preferably 12% by mass or more. The amount of resin particles relative to the total mass of white inkjet ink is preferably 30% by mass or less, more preferably 25% by mass or less, and even more preferably 20% by mass or less. The amount of resin particles relative to the total mass of white inkjet ink is preferably within a range from 5 to 30% by mass, more preferably from 8 to 25% by mass, even more preferably from 10 to 20% by mass, and still even more preferably from 12 to 20% by mass, for example.

The white inkjet ink preferably contains a water-soluble organic solvent. Organic compounds that are liquid at room temperature and can be dissolved in water can be used as the water-soluble organic solvent, and the use of a water-soluble organic solvent that mixes uniformly with an equal volume of water at 1 atmosphere and 20° C. is preferred. The boiling point of the water-soluble organic solvent is preferably 100° C. or higher, and more preferably 150° C. or higher.

Examples of the water-soluble organic solvent that may be used include those described above in relation to the pretreatment liquid, and the water-soluble organic solvent may be selected from among those described above in relation to the pretreatment liquid.

One of these water-soluble organic solvents may be used alone, or a combination of two or more water-soluble organic solvents may be used provided that the solvents form a single phase with water. The amount of water-soluble organic solvent relative to the total mass of white inkjet ink is preferably within a range from 5 to 50% by mass and more preferably from 10 to 40% by mass.

The white inkjet ink may contain one or more other components if necessary. Examples of these other components include water, surfactant, pH adjusters, preservatives, and the like.

There are no particular limitations on the water, but water containing as few ionic components as possible is preferred. In particular, from the viewpoint of the ink storage stability, the amount of polyvalent metal ions such as calcium ions is preferably kept low. Examples of the water include ion-exchanged water, distilled water, and ultrapure water.

From the viewpoint of adjustment of the ink viscosity, the amount of water relative to the total mass of white inkjet ink is preferably within a range from 30 to 70% by mass, more preferably from 35 to 65% by mass, and even more preferably from 40 to 60% by mass.

Examples of surfactants that may be used preferably include anionic surfactants, cationic surfactants, amphoteric surfactants, and nonionic surfactants. Two or more thereof may be used in combination. Among these surfactants, nonionic surfactants are particularly preferred. The surfactant may be, for example, a low-molecular weight surfactant or a polymer-based surfactant.

The HLB value of the surfactant is preferably within a range from 5 to 20 and more preferably from 10 to 18.

Examples of a nonionic surfactant that may be used include those described above in relation to the pretreatment liquid, and a nonionic surfactant may be selected from among those described above in relation to the pretreatment liquid. Among these, acetylene-based surfactants such as acetylene glycol-based surfactants can be used particularly favorably.

The amount of the surfactant relative to the total mass of white inkjet ink is preferably within a range from 0.01 to 10% by mass, more preferably from 0.1 to 5% by mass, and even more preferably from 0.2 to 3% by mass.

There are no particular limitations on the method used for producing the white inkjet ink, and production may be performed using appropriate conventional methods. For example, the ink may be obtained by using a stirring device such as a three-one motor to disperse all of the components, either in a single batch or in a number of separate batches, and then passing the resulting dispersion through a filtration device such as a membrane filter if desired.

The pH of white inkjet ink is preferably within a range from 7.0 to 10.0 and more preferably from 7.5 to 9.0 from the viewpoint of the ink storage stability.

The viscosity of the white inkjet ink at 23° C. is preferably within a range from 1 to 30 mPa·s from the viewpoint of the inkjet jetting characteristics, for example.

When the surface tension of the white inkjet ink is termed Y, the value of Y is preferably 28 mN/m or more, more preferably 30 mN/m or more, and even more preferably 32 mN/m or more. Y is preferably 50 mN/m or less, more preferably 45 mN/m or less, and even more preferably 42 mN/m or less. Y is preferably within a range from 28 mN/m to 50 mN/m, more preferably from 30 mN/m to 45 mN/m, and even more preferably from 32 mN/m to 42 mN/m, for example.

The surface tension of the white inkjet ink can be controlled by means of the type and amount of the water-soluble organic solvent, for example.

When the surface tension of the non-white inkjet ink is termed Z1, it is preferable that Y and Z1 satisfy the following formula 2 from the viewpoint of enhancing the color development properties of the non-white image.

$$-5\ mN/m \leq Y - Z1 \leq 10\ mN/m \qquad \text{(Formula 2)}$$

From the viewpoint of enhancing the color development properties of the non-white images, Y−Z1 is preferably −5 mN/m or more, more preferably −3 mN/m or more, and even more preferably −2 mN/m or more. From the viewpoint of enhancing the color development properties of the non-white images, Y−Z1 is preferably 10 mN/m or less, more preferably 8 mN/m or less, and even more preferably 6 mN/m or less. Y−Z1 is preferably within a range from −5 mN/m to 10 mN/m, more preferably from −3 mN/m to 8 mN/m, and even more preferably from −2 mN/m to 6 mN/m.

The white inkjet ink can be preferably used for textile printing.

The white inkjet ink can be applied to a substrate using an inkjet method to form a white image. A non-white inkjet ink can be applied to a substrate to which the white inkjet ink has been applied to form a non-white image. The white inkjet ink is preferably applied to a substrate to which a pretreatment liquid has been applied.

<Non-White Inkjet Ink>

Examples of the non-white inkjet ink include inks other than white ink, such as magenta ink, cyan ink, yellow ink, and black ink.

The non-white inkjet ink can include a non-white pigment as a colorant.

Examples of non-white pigments include organic pigments and inorganic pigments. Examples of the organic pigments include azo pigments, phthalocyanine pigments, polycyclic pigments, and dye lake pigments. Examples of the inorganic pigments include carbon blacks and metal oxides. Examples of the azo pigments include soluble azo lake pigments, insoluble azo pigments, and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments, and diketopyrrolopyrrole (DPP). Examples of the carbon blacks include furnace carbon black, lamp black, acetylene black, and channel black. Any one of these pigments may be used alone, or a combination of two or more pigments may be used.

From the viewpoints of jetting stability and storage stability, the average particle size of the non-white pigment particles in the non-white ink, expressed as the volume-based average value in a particle size distribution measured by means of a dynamic light scattering method, is preferably not more than 300 nm, more preferably not more than 200 nm, and even more preferably not more than 150 nm.

A self-dispersing pigment may be blended as a non-white pigment. A self-dispersing pigment is a pigment in which a hydrophilic functional group has been introduced to the pigment surface by means of a chemical treatment or a physical treatment. The hydrophilic functional group introduced into the self-dispersing pigment is preferably a group that has ionicity. By charging the pigment surface either anionically or cationically, the pigment particles can be stably dispersed in water by means of electrostatic repulsion. Examples of preferable anionic functional groups include carboxyl groups, sulfo groups, sulfino groups, sulfuric acid ester groups, phosphoric acid groups, phosphoric acid ester groups, phosphorous acid groups, and phosphorous acid ester groups. Examples of preferable cationic functional groups include quaternary ammonium groups and quaternary phosphonium groups.

These hydrophilic functional groups may be bonded directly to the pigment surface, or may be bonded via another atom grouping. Examples of this other atom grouping include, but are not limited to, alkylene groups, phenylene groups, and naphthylene groups. Examples of methods for treating the pigment surface include diazotization treatments, sulfonation treatments, hypochlorous acid treatments, humic acid treatments, and vacuum plasma treatments.

Examples of products that can be used favorably as self-dispersing pigments include the CAB-O-JET series of products such as "CAB-O-JET 200", "CAB-O-JET 300", "CAB-O-JET 250C", "CAB-O-JET 260M", "CAB-O-JET 270", and "CAB-O-JET 450C" manufactured by Cabot Corporation, and "BONJET BLACK CW-1", "BONJET BLACK CW-2", "BONJET BLACK CW-3", and "BONJET BLACK CW-4" manufactured by Orient Chemical Industries, Ltd. (wherein all of the above are product names).

Microencapsulated pigments in which the non-white pigment has been coated with a resin may also be used as the non-white pigment.

Pigment dispersions containing a non-white pigment that has already been dispersed using a pigment dispersant may also be used.

Examples of commercially available products of pigment dispersions including a non-white pigment dispersed using a pigment dispersant include the HOSTAJET series of products manufactured by Clariant AG, the FUJI SP series of products manufactured by Fuji Pigment Co., Ltd., and "AC-AK1" (a product name) manufactured by Dainichiseika Color & Chemicals Mfg. Co., Ltd.

Pigment dispersions that have been dispersed using the pigment dispersants described below may also be used.

From the viewpoint of further enhancing the color development properties of the non-white image, the charge density of the non-white pigment is preferably 200 μeq/g or less, more preferably 150 μeq/g or less, and even more preferably 120 μeq/g or less. If the charge density of the non-white pigment is 200 μeq/g or less, the color development properties of the non-white image are more likely to be further enhanced. Although the mechanism thereof is uncertain, it is speculated to be as follows. The amount of aggregating agent remaining on the surface of the fabric differs depending on the type of fabric used as the substrate, and for example, if the fabric has low water absorption properties, the aggregating agent is likely to remain on the surface of the fabric, and is also likely to be mixed in the white image. If the aggregating agent mixed in the white image reacts with the non-white pigment and the aggregation of the non-white pigment particles advances, the pigment particles tend to become larger, the number of particles tend to decrease, the distribution of the non-white pigment particles tends to become uneven, and the color development properties tend to decrease. If the charge density of the non-white pigment is 200 μeq/g or less, the reactivity of the non-white pigment with the aggregating agent mixed in the white image tends to decrease, the non-white pigment particles are more likely to be distributed uniformly, and the color development properties are likely to be further enhanced.

The charge density of the non-white pigment is preferably 30 μeq/g or more, and more preferably 50 μeq/g or more, from the viewpoint of suppressing bleeding and thereby forming sharp images with fabrics having high water repellency such as T-shirts which have been subjected to water repellency treatment.

The charge density of the non-white pigment is preferably within a range from 30 to 200 μeq/g, more preferably from 30 to 150 μeq/g, and even more preferably from 50 to 120 μeq/g, for example.

In the present specification, the charge density of the pigment is the charge density measured in accordance with a streaming potential method. The charge density of the pigment is the amount of charge per unit of mass of the solid fraction amount of the pigment of the pigment dispersion (unit: μeq/g). Specifically, a dilute liquid which is obtained by diluting the pigment dispersion to be measured 100 times with water is used as a sample, the obtained dilute liquid is titrated by using 0.0025N poly(diallyldimethylammonium chloride) solution, and the reaction end point where the streaming potential of the sample reaches 0 V is measured. The total amount of charge of the sample (the diluted pigment dispersion) can be determined from the amount of the 0.0025N poly(diallyldimethylammonium chloride) solution used in reaching this reaction end point. A value obtained by dividing the total amount of charge of the sample (the diluted pigment dispersion) by the solid fraction amount of the pigment contained in the sample is the charge density of the pigment (μeq/g). A colloid particle charge meter (such as "Model CAS" manufactured by AFG Analytic GmbH) or the like can be used as a charge density measurement device, for example.

One non-white pigment may be used alone or a combination of two or more non-white pigments may be used.

The amount of the non-white pigment relative to the total mass of the non-white inkjet ink is preferably within a range from 1 to 10% by mass, more preferably from 2 to 8% by mass, and even more preferably from 2 to 6% by mass from the viewpoints of print concentration and ink viscosity.

A pigment dispersant typified by polymer dispersants, surfactant-type dispersants, and the like can be used to stably disperse the non-white pigment in the non-white inkjet ink.

Examples of a pigment dispersant include those described above in relation to the white inkjet ink, and a pigment dispersant may be selected from among those pigment dispersants.

When used, there are no particular limitations on the blend amount of the non-white inkjet ink, which may vary depending on the type of pigment dispersant used, but generally the amount of the pigment dispersant, expressed as a mass ratio of the active component relative to a value of 1 for the pigment, is preferably within a range from 0.005 to 0.5.

The non-white inkjet ink may contain resin particles.

It is preferable that the resin particles can be dispersed in an aqueous solvent. It is preferable that the resin particles can be dispersed in water without being dissolved in the water and form an oil-in-water (O/W) type emulsion.

The resin particles can be blended as an oil-in-water resin emulsion in the production of the non-white inkjet ink.

For stable dispersion in water, the resin particles may be self-emulsifying resin particles in which hydrophilic groups and/or hydrophilic segments are introduced into the resin, or forced emulsifying resin particles in which the resin is forcibly dispersed using a dispersant.

From the viewpoint of further enhancing the color development properties of the non-white image, it is preferable that the resin particles in the non-white inkjet ink contain forced emulsifying resin particles. It is preferable that the resin does not have hydrophilic functional groups in the forced emulsifying resin particles.

The resin particles may be any of anionic resin particles, cationic resin particles, nonionic resin particles, and amphoteric resin particles, but anionic resin particles, nonionic resin particles, or combinations thereof are preferred, for example.

The anionic resin particles may be resin particles in which anionic functional groups of the resin are located on the resin particle surfaces, as in the case of self-emulsifying resins, or may be resin particles that have been subjected to a surface treatment by, for example, adhering an anionic dispersant to the resin particle surfaces.

The nonionic resin particles may be resin particles in which nonionic functional groups of the resin are located on the resin particle surfaces, as in the case of a self-emulsifying resin, or may be resin particles that have been subjected to a surface treatment by, for example, adhering a nonionic dispersant to the resin particle surfaces.

Examples of anionic functional groups, anionic dispersants, nonionic functional groups, and nonionic dispersants include those described above for the white ink resin particles described above.

The average particle size of the resin particles is preferably 600 nm or less, more preferably 300 nm or less, and even more preferably 200 nm or less, from the viewpoint of the inkjet jetting characteristics. The average particle size of the resin particles may be in the range from 10 nm to 600 nm, may be in the range from 50 nm to 300 nm, and may be in the range from 50 nm to 200 nm, for example.

As the type of resin particles, it is preferable to use a resin that forms a transparent coating film.

Examples of the resin particles include: conjugated diene-based resins such as styrene-butadiene copolymers, methyl methacrylate-butadiene copolymers, and vinyl chloride-vinyl acetate copolymers; acrylic-based resins such as polymers of any one or more selected from the group consisting of acrylic acid esters and methacrylic acid esters, and copolymers of any one or more selected from the group consisting of acrylic acid esters and methacrylic acid esters with styrene or the like; vinyl-based resins such as ethylene-vinyl acetate copolymers; functional-group modified resins in which any of these resins has been modified with a monomer containing a functional group such as a carboxyl group; melamine resins; urea resins; polyurethane resins; polyester resins; polyolefin resins; silicone resins; polyvinyl butyral resins; and alkyd resins.

Resin particles containing one of these resins may be used, but hybrid resin particles may also be used.

The resin particles preferably contain acrylic-based resin particles, urethane resin particles, or a combination thereof.

Examples of commercially available products of emulsions of resin particles include those exemplified for the white ink described above.

A single type of resin particles may be used alone or a combination of two or more types may be used.

From the viewpoint of the color development properties of the non-white image, the amount of the resin particles relative to the total mass of the non-white inkjet ink is preferably 10% by mass or more, more preferably 12% by mass or more, and even more preferably 14% by mass or more. If the amount of the resin particles relative to the total mass of the non-white inkjet ink is 10% by mass or more, even when heat drying is performed using a pressurized-type heating device such as a heat press, fluidity of the dots may be suppressed, mixing of the non-white ink with the white ink may thereby be easily suppressed, and color development properties of the non-white ink may be further improved.

The amount of the resin particles relative to the total mass of the non-white inkjet ink is preferably 30% by mass or less, more preferably 25% by mass or less, and even more preferably 20% by mass or less. The amount of the resin particles relative to the total mass of the non-white inkjet ink is preferably within a range from 10 to 30% by mass, more preferably from 12 to 25% by mass, and even more preferably from 14 to 20% by mass, for example.

The non-white inkjet ink preferably contains forced emulsifying resin particles. From the viewpoint of further enhancing the color development properties of the non-white image, the amount of forced emulsifying resin particles relative to the total mass of the non-white inkjet ink is preferably 3% by mass or more, more preferably 5% by mass or more, and even more preferably 10% by mass or more. The higher the blend amount of the forced emulsifying resin particles, the greater the tendency is for an increase in the value of Z2–Z1, which will be described later, to be suppressed. Although the mechanism thereof is uncertain, this is presumably because the shrinkage of the dots may be easily suppressed due to the following reasons and the like. For example, in the case of the forced emulsifying resin particles, the dispersant used to disperse the resin particles can lower the surface tension of the solvent. Further, since the forced emulsifying resin particles are dispersed with the dispersant, the steric hindrance and intermolecular force may contribute to dispersion stabilization more than the self-emulsifying resin particles, and aggregation is less likely to occur even when there is contact with the polyvalent metal salt mixed in the white ink layer.

The amount of the forced emulsifying resin particles relative to the total mass of the non-white inkjet ink is preferably 30% by mass or less, more preferably 25% by mass or less, and even more preferably 20% by mass or less. The amount of forced emulsifying resin particles relative to the total mass of the non-white inkjet ink is preferably within a range from 3 to 30% by mass, more preferably from 5 to 25% by mass, and even more preferably from 10 to 20% by mass, for example.

The amount of forced emulsifying resin particles is preferably 10% by mass or more, more preferably 30% by mass or more, and even more preferably 50% by mass or more, of the resin particles in the non-white inkjet ink.

The non-white inkjet ink can contain a water-soluble organic solvent. Organic compounds that are liquid at room temperature and can be dissolved in water can be used as the water-soluble organic solvent, and the use of a water-soluble organic solvent that mixes uniformly with an equal volume of water at 1 atmosphere and 20° C. is preferred. The boiling point of the water-soluble organic solvent is preferably 100° C. or higher and more preferably 150° C. or higher.

Examples of the water-soluble organic solvents that may be used include those described above in relation to the pretreatment liquid, and the water-soluble solvent may be selected from among those described above in relation to the pretreatment liquid.

One of these water-soluble organic solvents may be used alone, or a combination of two or more water-soluble organic solvents may be used provided the solvents form a single phase with water.

The amount of the water-soluble organic solvent in the non-white inkjet ink relative to the total mass of the non-white inkjet ink is preferably within a range from 10 to 50% by mass and more preferably within a range from 20 to 40% by mass.

The non-white inkjet ink preferably contains a surfactant.

Examples of surfactants that may be used preferably include anionic surfactants, cationic surfactants, amphoteric surfactants, and nonionic surfactants. Two or more thereof may be used in combination. Among these surfactants, nonionic surfactants are particularly preferred from the viewpoint of stability.

The surfactant may be, for example, a low-molecular weight surfactant or a polymer-based surfactant.

The HLB value of the surfactant is preferably within a range from 5 to 20 and more preferably from 10 to 18.

Examples of the surfactants that may be used include those described above in relation to the white inkjet ink, and the surfactant may be selected from among those described above in relation to the white inkjet ink. Among these, acetylene-based surfactants such as acetylene glycol-based surfactants can be used particularly favorably.

A single surfactant may be used, or a combination of two or more surfactants may be used.

The amount of the surfactant relative to the total mass of the non-white inkjet ink is preferably within a range from 0.01 to 10% by mass, more preferably from 0.1 to 5% by mass, and even more preferably from 0.2 to 3% by mass.

The non-white inkjet ink may also contain one or more other components if necessary. Examples of these other components include water, pH adjusters, preservatives, and the like.

There are no particular limitations on the water, but water containing as few ionic components as possible is preferred. In particular, from the viewpoint of the ink storage stability, the amount of polyvalent metal ions such as calcium ions is preferably kept low. Examples of the water include ion-exchanged water, distilled water, and ultrapure water.

From the viewpoint of adjustment of the ink viscosity, the amount of water relative to the total mass of the non-white inkjet ink is preferably within a range from 30 to 70% by mass and more preferably from 35 to 65% by mass.

There are no particular limitations on the method used for producing the non-white inkjet ink, and production may be performed using appropriate conventional methods. For example, the ink may be obtained by using a stirring device such as a three-one motor to disperse all of the components, either in a single batch or in a number of separate batches, and then passing the resulting dispersion through a filtration device such as a membrane filter if desired.

The pH of the non-white inkjet ink is preferably within a range from 7.0 to 10.0 and more preferably from 7.5 to 9.0 from the viewpoint of the storage stability of the ink.

The viscosity of the non-white inkjet ink at 23° C. is preferably within a range from 1 to 30 mPa·s from the viewpoint of inkjet jetting characteristics, for example.

When the surface tension of the non-white inkjet ink is termed Z1, Z1 is preferably 28 mN/m or more, more preferably 30 mN/m or more, and even more preferably 32 mN/m or more. Z1 is preferably 50 mN/m or less, more preferably 45 mN/m or less, and even more preferably 42 mN/m or less. Z1 is preferably within a range from 28 mN/m to 50 mN/m, more preferably from 30 mN/m to 45 mN/m, and even more preferably from 32 mN/m to 42 mN/m, for example.

The surface tension of the non-white inkjet ink can be controlled by means of the type and amount of the surfactant, water-soluble organic solvent, and the like, for example.

When the surface tension of the liquid having a composition in which the surfactant is excluded from the non-white inkjet ink is termed Z2, from the viewpoint of enhancing the color development properties of the non-white image, the value of Z2–Z1 is preferably 10 mN/m or less, more preferably 8 mN/m or less, and even more preferably 6.5 mN/m or less.

The value of Z2–Z1 is preferably 0 mN/m or more. The value of Z2–Z1 may be more than 0 mN/m, for example.

From the viewpoint of enhancing the color development properties of the non-white image, the value of Z2–Z1 is preferably within a range from 0 mN/m to 10 mN/m, that is, it is preferable to satisfy the following formula 3.

$$0\ mN/m \leq Z2 - Z1 \leq 10\ mN/m \quad \text{(Formula 3)}$$

The value of Z2–Z1 is more preferably within a range from 0 mN/m to 6.5 mN/m, that is, it is preferable to satisfy the following formula 4.

$$0\ mN/m \leq Z2 - Z1 \leq 6.5\ mN/m \quad \text{(Formula 4)}$$

Z2–Z1 can be controlled by selecting resin particles, pigment particles, and a water-soluble solvent, for example. In addition, if the non-white ink resin particles contain forced emulsifying resin particles, Z2–Z1 can be easily reduced.

The non-white inkjet ink can be preferably used for textile printing.

The non-white inkjet ink can be applied to a substrate using an inkjet method to form a non-white image. It is preferable to apply the non-white inkjet ink to a substrate to which the white inkjet ink has been applied to form a non-white image.

The ink set for textile printing of one embodiment can be preferably used for printing on a fabric.

Examples of fibers included in the fabric include natural fibers such as cotton, silk, wool, and linen; chemical fibers such as polyester, acrylic, polyurethane, nylon, rayon, cupra, and acetate, and the like. The fabric may contain one type of fibers or a combination of two or more types of fibers. Further, the fabric may be, for example, a woven fabric, a knitted fabric, a nonwoven fabric, or the like.

<Method for Producing Printed Textile Item>

A method for producing a printed textile item of one embodiment can include applying a pretreatment liquid to a fabric (hereinafter also referred to as a "pretreatment liquid application step"), applying a white inkjet ink using an inkjet method to the fabric to which the pretreatment liquid has been applied (hereinafter also referred to as a "white ink application step"), and applying a non-white inkjet ink using an inkjet method to the fabric to which the white inkjet ink has been applied (hereinafter also referred to as a "non-white ink application step"). As the pretreatment liquid, a pretreatment liquid described above that may be contained in the ink set of one embodiment described above may be used. Further, as the white inkjet ink, an ink described above as the white inkjet ink that may be contained in the ink set of one embodiment described above may be used. Still further, as the non-white inkjet ink, an ink described above as the non-white inkjet ink that may be contained in the ink set of one embodiment described above may be used. As the fabric, it is possible to use a fabric described above as the fabric on which the ink set of one embodiment described above can be used.

The pretreatment liquid application step will be described.

The method for applying a pretreatment liquid to a fabric is not particularly limited, and any method such as a spray method using an airbrush or the like, a dipping method, a pad method, a coating method, or the like can be used, for example. In addition, it is possible to use various printing methods such as inkjet printing (an inkjet method) and screen printing.

There are no particular limitations on the inkjet method, and any one of a piezo method, electrostatic method, and thermal method may be used. When an inkjet printing device is used, liquid droplets of the pretreatment liquid or ink are preferably jetted from the inkjet head based on a digital signal so that the jetted ink droplets are adhered to the fabric.

The region of the fabric to which the pretreatment liquid is applied may be a region of the same shape as the image that is to be formed by using the white inkjet ink, may be a broader region that incorporates the shape of the image to be formed by using the white inkjet ink, or may be the entire surface of the fabric, for example.

The application region for the pretreatment liquid, the application region for the white inkjet ink, and the application region for the non-white inkjet ink preferably overlap at least partially.

The amount of the pretreatment liquid applied to the fabric is preferably within a range from 10 to 100 $g/m^2$, more preferably from 20 to 75 $g/m^2$, and even more preferably from 30 to 50 $g/m^2$.

The white ink application step will be described.

The white inkjet ink is preferably applied to the fabric using an inkjet method. There are no particular limitations on the inkjet method, and any one of a piezo method, electrostatic method, and thermal method may be used. When an inkjet printing device is used, liquid droplets of the pretreatment liquid or ink are preferably jetted from the inkjet head based on a digital signal so that the jetted ink droplets are adhered to the fabric.

It is preferable that the white inkjet ink is applied such that the application region for the pretreatment liquid and the application region for the white inkjet ink overlap at least partially. It is preferable that the application region for the pretreatment liquid and the application region for the white inkjet ink overlap at least partially.

The white inkjet ink is preferably applied, using a wet-on-wet method, to the fabric to which the pretreatment liquid has been applied. The white inkjet ink is preferably applied in a state where the moisture has not been completely removed from the fabric to which the pretreatment liquid has been applied. It is preferable that the white inkjet ink is applied while the fabric to which the pretreatment liquid has been applied is maintained in a wet state. Following the application of the pretreatment liquid to the fabric, the white inkjet ink is preferably applied to the fabric without first performing a drying step such as heat drying, for example. The temperature of the fabric surface following application of the pretreatment liquid and up until the application of the white inkjet ink is preferably not more than 40° C., and more preferably not more than 35° C. Following application of the pretreatment liquid, it is preferable that the white inkjet ink is applied in a state where the residual amount of the volatile fraction of the pretreatment liquid on the fabric is still at least 90% by mass. The time period from the application of the pretreatment liquid to the fabric until the application of the white inkjet ink is preferably within a range from 0.1 to 200 seconds.

The amount of the white inkjet ink applied to the fabric is not particularly limited, but for example is preferably within a range from 50 to 400 g/m$^2$ and more preferably from 100 to 200 g/m$^2$.

The non-white ink application step will be described.

The non-white inkjet ink is preferably applied to the fabric using an inkjet method. There are no particular limitations on the inkjet method, and any one of a piezo method, electrostatic method, and thermal method may be used. When an inkjet printing device is used, liquid droplets of the pretreatment liquid or ink are preferably jetted from the inkjet head based on a digital signal so that the jetted ink droplets are adhered to the fabric.

It is preferable to apply the non-white inkjet ink such that the application region for the white inkjet ink and the application region at least partially overlap. It is preferable that the application region for the pretreatment liquid, the application region for the white inkjet ink, and the application region for the non-white inkjet ink overlap at least partially.

The non-white inkjet ink is preferably applied, using a wet-on-wet method, to the fabric to which the white inkjet ink has been applied. The non-white inkjet ink is preferably applied in a state where the moisture has not been completely removed from the fabric to which the white inkjet ink has been applied. It is preferable that the non-white inkjet ink is applied while the fabric to which the white inkjet ink has been applied is maintained in a wet state. Following the application of the white inkjet ink to the fabric, the non-white inkjet ink is preferably applied to the fabric without first performing a drying step such as heat drying, for example. The temperature of the fabric surface following application of the white inkjet ink and up to the application of the non-white inkjet ink is preferably not more than 40° C., and more preferably not more than 35° C. Following the application of the white inkjet ink, it is preferable that the non-white inkjet ink is applied in a state where the residual amount of the volatile fraction of the white inkjet ink on the fabric is still at least 90% by mass. The time period from the application of the white inkjet ink to the fabric until the application of the non-white inkjet ink is preferably within a range from 0.1 to 200 seconds.

The application amount of the non-white inkjet ink to the fabric is not particularly limited, but is preferably within a range from 5 to 60 g/m$^2$, and more preferably from 10 to 30 g/m$^2$, for example.

A single non-white inkjet ink may be applied or two or more non-white inkjet inks may be applied.

In those cases where the pretreatment liquid is applied using an inkjet method, the application of the pretreatment liquid and the application of the white inkjet ink may be performed using separate printing devices or using a single printing device.

The application of the white inkjet ink and the application of the non-white inkjet ink may be performed by using a single printing device or by using separate printing devices, for example. The application of the pretreatment liquid, the application of the white inkjet ink, and the application of the non-white inkjet ink may be performed by using a single printing device, for example. Further, two printing devices may be used, one of the two devices may be used for the application of the pretreatment liquid, and the other of the two devices may be used for the application of the white inkjet ink and the application of the non-white inkjet ink, for example.

It is preferable to provide a step of subjecting the fabric to a heat treatment after the non-white ink application step.

The heat treatment temperature may be selected as appropriate in accordance with the material of the fabric and the like. The heat treatment temperature is preferably at least 100° C., and more preferably at least 150° C., for example. From the viewpoint of reducing any damage to the fabric, the heat treatment temperature is preferably not more than 200° C.

There are no particular limitations on the heating device, and for example, a heat press, roll heater, hot air device, infrared lamp heater, or the like may be used.

The heat treatment time may be set as appropriate in accordance with the heating method and the like, and is preferably within a range from 1 second to 10 minutes. The heat treatment time may be within a range from 5 seconds to 5 minutes, for example.

After the non-white ink application step, a post-treatment liquid application step may be provided. After the non-white ink application step, a step of subjecting the fabric to a heat treatment may be provided, and thereafter the post-treatment liquid may be applied, for example. The post-treatment liquid may be applied using a wet-on-wet method after the non-white ink application step, for example. Further, the step of subjecting the fabric to a heat treatment may also be provided after the application of the post-treatment liquid.

EXAMPLES

Embodiments of the present invention will be described below in further detail by using examples. The present invention is not limited to the examples below. In the following descriptions, "%" represents "% by mass" unless specifically stated otherwise.

1. Production of Pretreatment Liquid

Table 1 shows formulations of pretreatment liquids. The raw materials were mixed at the blending ratio shown in Table 1, and the obtained mixtures were filtered by using a cellulose acetate membrane filter having a pore size of 3 μm. Accordingly, pretreatment liquids PT1 to PT5 were obtained.

Details of the raw materials shown in Table 1 are as follows. The amount of magnesium nitrate hexahydrate shown in Table 1 is the amount as hexahydrate.

(Polyvalent Metal Salts)

Magnesium nitrate hexahydrate: manufactured by FUJIFILM Wako Pure Chemical Corporation, active component (amount as anhydride) 57.8% by mass (Surfactant).

OLFINE E1020: acetylene glycol-based surfactant, manufactured by Nisshin Chemical Industry Co., Ltd., active component 100% by mass OLFINE E1010: acetylene glycol-based surfactant, manufactured by Nisshin Chemical Industry Co., Ltd., active component 100% by mass (Water-Soluble Organic Solvent)

Diethylene glycol: manufactured by FUJIFILM Wako Pure Chemical Corporation

Triethylene glycol: manufactured by FUJIFILM Wako Pure Chemical Corporation

Glycerol: manufactured by FUJIFILM Wako Pure Chemical Corporation

TABLE 1

| Formulation of pretreatment liquid | | Pretreatment liquid | | | | |
|---|---|---|---|---|---|---|
| Raw material (% by mass) | | PT1 | PT2 | PT3 | PT4 | PT5 |
| Polyvalent metal salt | Magnesium nitrate hexahydrate (active component 57.8%) | 51.9 | 51.9 | 51.9 | 51.9 | 51.9 |
| Surfactant | OLFINE E1020 (active component 100%) | 0.8 | 0.8 | | | 0.1 |
| | OLFINE E1010 (active component 100%) | | | 0.8 | | |
| Water-soluble organic solvent | Diethylene glycol | 14.5 | 15.5 | 15.5 | 15.5 | 15.5 |
| | Triethylene glycol | | 9.0 | | 9.0 | 9.0 |
| | Glycerol | 9.0 | | 9.0 | | |
| Ion-exchanged water | | 23.8 | 22.8 | 22.8 | 23.6 | 23.5 |
| Total (% by mass) | | 100.0 | 100.0 | 100.0 | 100.0 | 100.0 |
| Surface tension (X) (mN/m) | | 36.9 | 38.3 | 26.5 | 60.1 | 46.3 |

2. Production of White Ink (1) Production of White Pigment Dispersion

First, 250 g of titanium oxide "R62N" (manufactured by Sakai Chemical Industry Co., Ltd.) as a white pigment and 10 g (active component: 2.5 g) of "DEMOL EP" (manufactured by Kao Corporation) as a pigment dispersant were mixed with 740 g of ion-exchanged water, and a beads mill (DYNO-MILL KDL model A, manufactured by Shinmaru Enterprises Corporation) containing 0.5 mmø zirconia beads at a fill ratio of 80% was used to disperse the mixture under conditions including a retention time of 2 minutes, thus obtaining a white pigment dispersion (pigment fraction: 25% by mass).

(2) Production of White Ink

Table 2 shows the formulations of white inks W1 to W5. The raw materials were mixed at the blending ratios shown in the table, and the obtained mixtures were filtered by using a cellulose acetate membrane filter having a pore size of 3 μm. Accordingly, the white inks W1 to W5 were obtained.

Details of the raw materials of the white inks W1 to W5 shown in Table 2 are as follows. In Table 2, the amounts of the resin emulsion and the pigment dispersion are expressed as the total amount including the aqueous medium and the like.

(Pigment Dispersion)

White pigment dispersion: obtained using the method described above, pigment fraction: 25% by mass (Resin Emulsion)

SUPERFLEX 740: polyurethane resin emulsion, manufactured by DKS Co., Ltd., resin fraction 40.0% by mass SUPERFLEX 150: polyurethane resin emulsion, manufactured by DKS Co., Ltd., resin fraction 30.0% by mass (Surfactant)

OLFINE E1020: acetylene glycol-based surfactant, manufactured by Nisshin Chemical Industry Co., Ltd., active component 100% by mass OLFINE E1010: acetylene glycol-based surfactant, manufactured by Nisshin Chemical Industry Co., Ltd., active component 100% by mass (Water-Soluble Organic Solvent)

Glycerol: manufactured by FUJIFILM Wako Pure Chemical Corporation

Diethylene glycol: manufactured by FUJIFILM Wako Pure Chemical Corporation

TABLE 2

| Formulation of white ink | | White ink | | | | |
|---|---|---|---|---|---|---|
| Raw material (% by mass) | | W1 | W2 | W3 | W4 | W5 |
| Pigment dispersion | White pigment dispersion (pigment fraction 25%) | 40.0 | 40.0 | 40.0 | 40.0 | 40.0 |
| Resin emulsion | SUPERFLEX 740 (resin fraction 40%) | 37.5 | 37.5 | 22.5 | 37.5 | 37.5 |
| | SUPERFLEX 150 (resin fraction 30%) | | | 20.0 | | |
| Water-soluble organic solvent | Glycerol | 5.0 | 20.0 | 5.0 | 5.0 | 5.0 |
| | Diethylene glycol | 15.0 | | 11.8 | 15.0 | 15.0 |
| Surfactant | OLFINE E1010 (active component 100%) | 0.7 | 0.7 | 0.7 | | |
| | OLFINE E1020 (active component 100%) | | | | 0.7 | |
| Ion-exchanged water | | 1.8 | 1.8 | | 1.8 | 2.5 |
| Total (% by mass) | | 100.0 | 100.0 | 100.0 | 100.0 | 100.0 |
| Surface tension (Y) (mN/m) | | 34.5 | 34.0 | 34.2 | 40.3 | 48.0 |

3. Production of Non-White Ink

Tables 3 to 6 show the formulations of non-white inks C1 to C11 and non-white inks C1X to C11X. The non-white inks C1X to C11X have compositions in which surfactants are excluded from the non-white inks C1 to C11 respectively.

The raw materials were mixed at the blending ratios shown in the tables, and the obtained mixtures were filtered by using a cellulose acetate membrane filter having a pore size of 3 am. Accordingly, the non-white inks C1 to C11 and the non-white inks C1X to C11X were obtained.

Details of the raw materials of the non-white inks C1 to C11 and the non-white inks C1X to C11X listed in Tables 3 to 6 are as follows. In Tables 3 to 6, the amounts of the resin emulsion and the pigment dispersion are expressed as the total amount including the aqueous medium and the like.

(Pigment Dispersion)

AC-AK1: pigment dispersion dispersed by dispersant, manufactured by Dainichiseika Color & Chemicals Mfg. Co., Ltd., pigment fraction 14.0% by mass BONJET BLACK CW-1: self-dispersing pigment dispersion, manufactured by Orient Chemical Industries Co., Ltd., pigment fraction 20.0% by mass FUJI SP Black 8140: self-dispersing pigment dispersion, manufactured by Fuji Pigment Co., Ltd., pigment fraction 15.0% by mass BONJET BLACK CW-2: self-dispersing pigment dispersion, manufactured by Orient Chemical Industries Co., Ltd., pigment fraction 15.0% by mass (Resin Emulsion)

Mowinyl 6763: acrylic-based resin emulsion (forced emulsification type), manufactured by Japan Coating Resin Corporation, resin fraction 45.0% by mass Mowinyl 6718: acrylic-based resin emulsion (forced emulsification type), manufactured by Japan Coating Resin Corporation, resin fraction 45.0% by mass SUPERFLEX 470: polyurethane resin emulsion (self-emulsification type), manufactured by DKS Co., Ltd., resin fraction 38.0% by mass SUPERFLEX 740: polyurethane resin emulsion (self-emulsification type), manufactured by DKS Co., Ltd., resin fraction 40.0% by mass SUPERFLEX 460: polyurethane resin emulsion (self-emulsification type), manufactured by DKS Co., Ltd., resin fraction 38.0% by mass (Surfactant)

OLFINE E1010: acetylene glycol-based surfactant, manufactured by Nisshin Chemical Industry Co., Ltd., active component amount 100% by mass SURFYNOL 465: acetylene glycol-based surfactant, manufactured by Evonik Industries AG, active component amount 100% by mass (Water-Soluble Organic Solvent)

Glycerol: manufactured by FUJIFILM Wako Pure Chemical Corporation

Diethylene glycol: manufactured by FUJIFILM Wako Pure Chemical Corporation

Ethylene glycol: manufactured by FUJIFILM Wako Pure Chemical Corporation

Diethylene glycol monobutyl ether: manufactured by FUJIFILM Wako Pure Chemical Corporation 4. Measurement of Charge Density of Pigment Tables 3 to 6 show the charge densities of the pigment dispersions used for non-white inks C1 to C11. The charge density of each pigment dispersion listed in the tables is a value obtained with the following procedure using a streaming potential method. A colloid particle charge meter (manufactured by AFG Analytic GmbH, Model CAS) was used to measure the charge density. A pigment dispersion to be measured was diluted 100 times with ion-exchanged water for use as a sample, the sample was titrated by using a 0.0025N poly(diallyldimethylammonium chloride) solution (manufactured by FUJIFILM Wako Pure Chemical Corporation), and the reaction end point where the streaming potential of the sample reached 0 V was measured. The total amount of charge of the sample (diluted water dispersion of pigment particles) was obtained from the amount of the 0.0025N poly(diallyldimethylammonium chloride) solution used in reaching this reaction end point. A value obtained by dividing the total amount of charge of the sample by the solid fraction amount of the pigment contained in the sample is the charge density of the pigment (μeq/g).

5. Measurement of Surface Tension

Tables 1 to 6 show the surface tensions of the pretreatment liquids PT1 to PT5, white inks W1 to W5, and non-white inks C1 to C11 and C1X to C11X. The surface tensions shown in Tables 1 to 6 were determined using the Science Line t60 device manufactured by SITA Process Solutions of SITA Messtechnik GmbH, under measurement conditions of 23° C. and 0.05 Hz.

TABLE 3

| Formulation of non-white ink | | Charge-density | Non-white ink | | | | | |
|---|---|---|---|---|---|---|---|---|
| Raw material (parts by mass) | | (μeq/g) | C1 | C1X | C2 | C2X | C3 | C3X |
| Pigment dispersion | AC-AK1 (pigment fraction 14.0%) | 98 | 28.6 | 28.6 | 28.6 | 28.6 | 28.6 | 28.6 |
| | BONJET BLACK CW-1 (pigment fraction 20.0%) | 247 | | | | | | |
| | FUJI SP BLACK 8140 (pigment fraction 15.0%) | 225 | | | | | | |
| | BONJET BLACK CW-2 (pigment fraction 15.0%) | 318 | | | | | | |
| Resin emulsion | Mowinyl 6763 (resin fraction 45.0%) | | 33.3 | 33.3 | | | 13.3 | 13.3 |
| | Mowinyl 6718 (resin fraction 45.0%) | | | | 33.3 | 33.3 | | |
| | SUPERFLEX 470 (resin fraction 38.0%) | | | | | | | |
| | SUPERFLEX 740 (resin fraction 40.0%) | | | | | | 22.5 | 22.5 |
| | SUPERFLEX 460 (resin fraction 38.0%) | | | | | | | |

TABLE 3-continued

| Formulation of non-white ink<br>Raw material (parts by mass) | | Charge-density (μeq/g) | C1 | C1X | C2 | C2X | C3 | C3X |
|---|---|---|---|---|---|---|---|---|
| Surfactant | OLFINE E1010 (active component 100%) | | 0.5 | | 0.5 | | 0.5 | |
| | SURFYNOL 465 (active component 100%) | | | | | | | |
| Water-soluble organic solvent | Glycerol | | 10.0 | 10.0 | 10.0 | 10.0 | 10.0 | 10.0 |
| | Diethylene glycol | | 20.0 | 20.0 | 20.0 | 20.0 | 20.0 | 20.0 |
| | Ethylene glycol | | | | | | | |
| | Diethylene glycol monobutyl ether | | | | | | | |
| Ion-exchanged water | | | 7.6 | 7.6 | 7.6 | 7.6 | 5.1 | 5.1 |
| Total (parts by mass) | | | 100.0 | 99.5 | 100.0 | 99.5 | 100.0 | 99.5 |
| Surface tension (mN/m) | | | 35.2 | 41.0 | 32.4 | 37.2 | 36.1 | 42.2 |
| | | | Z1 | Z2 | Z1 | Z2 | Z1 | Z2 |
| Z2 − Z1 (mN/m) | | | 5.8 | | 4.8 | | 6.1 | |

TABLE 4

| Formulation of non-white ink<br>Raw material (parts by mass) | | Charge density (μeq/g) | C4 | C4X | C5 | C5X | C6 | C6X |
|---|---|---|---|---|---|---|---|---|
| Pigment dispersion | AC-AK1 (pigment fraction 14.0%) | 98 | 28.6 | 28.6 | | | | |
| | BONJET BLACK CW-1 (pigment fraction 20.0%) | 247 | | | | | 20.0 | 20.0 |
| | FUJI SP BLACK 8140 (pigment fraction 15.0%) | 225 | | | 26.7 | 26.7 | | |
| | BONJET BLACK CW-2 (pigment fraction 15.0%) | 318 | | | | | | |
| Resin emulsion | Mowinyl 6763 (resin fraction 45.0%) | | 13.3 | 13.3 | 33.3 | 33.3 | | |
| | Mowinyl 6718 (resin fraction 45.0%) | | | | | | | |
| | SUPERFLEX 470 (resin fraction 38.0%) | | 23.7 | 23.7 | | | 39.5 | 39.5 |
| | SUPERFLEX 740 (resin fraction 40.0%) | | | | | | | |
| | SUPERFLEX 460 (resin fraction 38.0%) | | | | | | | |
| Surfactant | OLFINE E1010 (active component 100%) | | 0.5 | | 0.5 | | 0.5 | |
| | SURFYNOL 465 (active component 100%) | | | | | | | |
| Water-soluble organic solvent | Glycerol | | 10.0 | 10.0 | 10.0 | 10.0 | 10.0 | 10.0 |
| | Diethylene glycol | | 20.0 | 20.0 | 20.0 | 20.0 | 20.0 | 20.0 |
| | Ethylene glycol | | | | | | | |
| | Diethylene glycol monobutyl ether | | | | | | | |
| Ion-exchanged water | | | 3.9 | 3.9 | 9.5 | 9.5 | 10.0 | 10.0 |
| Total (parts by mass) | | | 100.0 | 99.5 | 100.0 | 99.5 | 100.0 | 99.5 |
| Surface tension (mN/m) | | | 35.4 | 41.5 | 36.5 | 47.2 | 36.0 | 48.5 |
| | | | Z1 | Z2 | Z1 | Z2 | Z1 | Z2 |
| Z2 − Z1 (mN/m) | | | 6.1 | | 10.7 | | 12.5 | |

TABLE 5

| Formulation of non-white ink | | Charge-density | Non-white ink | | | | | |
|---|---|---|---|---|---|---|---|---|
| Raw material (parts by mass) | | (μeq/g) | C7 | C7X | C8 | C8X | C9 | C9X |
| Pigment dispersion | AC-AK1 (pigment fraction 14.0%) | 98 | | | 28.6 | 28.6 | 28.6 | 28.6 |
| | BONJET BLACK CW-1 (pigment fraction 20.0%) | 247 | | | | | | |
| | FUJI SP BLACK 8140 (pigment fraction 15.0%) | 225 | | | | | | |
| | BONJET BLACK CW-2 (pigment fraction 15.0%) | 318 | 30.0 | 30.0 | | | | |
| Resin emulsion | Mowinyl 6763 (resin fraction 45.0%) | | | | 33.3 | 33.3 | | |
| | Mowinyl 6718 (resin fraction 45.0%) | | | | | | | |
| | SUPERFLEX 470 (resin fraction 38.0%) | | | | | | | |
| | SUPERFLEX 740 (resin fraction 40.0%) | | | | | | 37.5 | 37.5 |
| | SUPERFLEX 460 (resin fraction 38.0%) | | 24.0 | 24.0 | | | | |
| Surfactant | OLFINE E1010 (active component 100%) | | | | 0.5 | | 0.5 | |
| | SURFYNOL 465 (active component 100%) | | 1.0 | | | | | |
| Water-soluble organic solvent | Glycerol | | 7.0 | 7.0 | 10.0 | 10.0 | 10.0 | 10.0 |
| | Diethylene glycol | | | | 17.0 | 17.0 | 20.0 | 20.0 |
| | Ethylene glycol | | 7.0 | 7.0 | | | | |
| | Diethylene glycol monobutyl ether | | | | 3.0 | 3.0 | | |
| Ion-exchanged water | | | 31.0 | 31.0 | 7.6 | 7.6 | 3.4 | 3.4 |
| Total (parts by mass) | | | 100.0 | 99.0 | 100.0 | 99.5 | 100.0 | 99.5 |
| Surface tension (mN/m) | | | 32.3 | 57.0 | 32.9 | 34.7 | 34.9 | 41.6 |
| | | | Z1 | Z2 | Z1 | Z2 | Z1 | Z2 |
| Z2 − Z1 (mN/m) | | | 24.7 | | 1.8 | | 6.7 | |

TABLE 6

| Formulation of non-white ink | | Charge density | Non-white ink | | | |
|---|---|---|---|---|---|---|
| Raw material (parts by mass) | | (μeq/g) | C10 | C10X | C11 | C11X |
| Pigment dispersion | AC-AK1 (pigment fraction 14.0%) | 98 | 28.6 | 28.6 | 28.6 | 28.6 |
| | BONJET BLACK CW-1 (pigment fraction 20.0%) | 247 | | | | |
| | FUJI SP BLACK 8140 (pigment fraction 15.0%) | 225 | | | | |
| | BONJET BLACK CW-2 (pigment fraction 15.0%) | 318 | | | | |
| Resin emulsion | Mowinyl 6763 (resin fraction 45.0%) | | 33.3 | 33.3 | | |
| | Mowinyl 6718 (resin fraction 45.0%) | | | | | |
| | SUPERFLEX 470 (resin fraction 38.0%) | | | | 39.5 | 39.5 |
| | SUPERFLEX 740 (resin fraction 40.0%) | | | | | |
| | SUPERFLEX 460 (resin fraction 38.0%) | | | | | |
| Surfactant | OLFINE E1010 (active component 100%) | | 0.1 | | 0.5 | |
| | SURFYNOL 465 (active component 100%) | | | | | |
| Water-soluble organic solvent | Glycerol | | 10.0 | 10.0 | 10.0 | 10.0 |
| | Diethylene glycol | | 20.0 | 20.0 | 20.0 | 20.0 |
| | Ethylene glycol | | | | | |
| | Diethylene glycol monobutyl ether | | | | | |
| Ion-exchanged water | | | 8.0 | 8.0 | 1.4 | 1.4 |
| Total (parts by mass) | | | 100.0 | 99.9 | 100.0 | 99.5 |
| Surface tension (mN/m) | | | 38.7 | 40.8 | 35.3 | 42.9 |
| | | | Z1 | Z2 | Z1 | Z2 |
| Z2 − Z1 (mN/m) | | | 2.1 | | 7.6 | |

6. Production of Printed Textile Item

Printed textile items of Examples 1 to 14 and Comparative Examples 1 to 6 were produced based on the following procedure using the pretreatment liquids PT1 to PT5, white inks W1 to W5, and non-white inks C1 to C11 which were produced above.

Tables 7 to 9 show the pretreatment liquids, white inks, and non-white inks used for producing the printed textile items of Examples 1 to 14 and Comparative Examples 1 to 6.

A black cotton T-shirt (product name: Printstar) manufactured by Toms Co., Ltd. was used as a substrate, and the pretreatment liquid was applied to a 10 cm×20 cm portion of the surface of the black cotton T-shirt using an inkjet method. The image was a solid image, and the application amount of the pretreatment liquid was about 50 g/m$^2$. After the pretreatment liquid was applied, the white ink was applied using an inkjet method to the portion where the pretreatment liquid was applied, without providing a drying step. The image was a solid image, and the application amount of the white ink was about 180 g/m$^2$. After the white ink was applied, the non-white ink was applied using an inkjet method to the portion where the white ink was applied, without providing a drying step. The image was a solid image, and the application amount of the non-white ink was about 20 g/m$^2$. An "MMP-8130" (product name) manufactured by Mastermind Inc. was used as a printing device for all of the application of the pretreatment liquid, the application of the white ink, and the application of the non-white ink. After the application of the non-white ink, heat drying was performed at 160° C. for 2 minutes using a heat press machine manufactured by Fusion Co. Accordingly, a printed textile item having a 10 cm×20 cm solid image was obtained.

7. Evaluation of the Printed Textile Item

The non-white image of the printed textile item was evaluated visually, and the color development properties of the non-white image were determined according to the following criteria. The evaluation results are shown in the table.

A: Color development properties of the non-white image are very good

B: Color development properties of the non-white image are good

C: Color development properties of the non-white image are insufficient

TABLE 7

| | Example 1 | Example 2 | Example 3 | Example 4 | Example 5 | Example 6 | Example 7 |
|---|---|---|---|---|---|---|---|
| Pretreatment liquid | PT1 | PT1 | PT1 | PT1 | PT1 | PT1 | PT1 |
| X (mN/m) | 36.9 | 36.9 | 36.9 | 36.9 | 36.9 | 36.9 | 36.9 |
| White ink | W1 | W1 | W1 | W1 | W2 | W3 | W4 |
| Y (mN/m) | 34.5 | 34.5 | 34.5 | 34.5 | 34.0 | 34.2 | 40.3 |
| Non-white ink | C1 | C2 | C3 | C4 | C1 | C1 | C1 |
| Z1 (mN/m) | 35.2 | 32.4 | 36.1 | 35.4 | 35.2 | 35.2 | 35.2 |
| Z2 (mN/m) | 41.0 | 37.2 | 42.2 | 41.5 | 41.0 | 41.0 | 41.0 |
| Y − Z1 (mN/m) | −0.7 | 2.1 | −1.6 | −0.9 | −1.2 | −1.0 | 5.1 |
| Z2 − Z1 (mN/m) | 5.8 | 4.8 | 6.1 | 6.1 | 5.8 | 5.8 | 5.8 |
| Color development properties of non-white image | A | A | B | B | A | A | A |

TABLE 8

| | Example 8 | Example 9 | Example 10 | Example 11 | Example 12 | Example 13 | Example 14 |
|---|---|---|---|---|---|---|---|
| Pretreatment liquid | PT2 | PT5 | PT1 | PT1 | PT1 | PT1 | PT1 |
| X (mN/m) | 38.3 | 46.3 | 36.9 | 36.9 | 36.9 | 36.9 | 36.9 |
| White ink | W1 | W1 | W4 | W1 | W1 | W1 | W1 |
| Y (mN/m) | 34.5 | 34.5 | 40.3 | 34.5 | 34.5 | 34.5 | 34.5 |
| Non-white ink | C1 | C1 | C2 | C10 | C8 | C9 | C11 |
| Z1 (mN/m) | 35.2 | 35.2 | 32.4 | 38.7 | 32.9 | 34.9 | 35.3 |
| Z2 (mN/m) | 41.0 | 41.0 | 37.2 | 40.8 | 34.7 | 41.6 | 42.9 |
| Y − Z1 (mN/m) | −0.7 | −0.7 | 7.9 | −4.2 | 1.6 | −0.4 | −0.8 |
| Z2 − Z1 (mN/m) | 5.8 | 5.8 | 4.8 | 2.1 | 1.8 | 6.7 | 7.6 |
| Color development properties of non-white image | A | B | B | B | A | B | B |

TABLE 9

| | Comparative Example 1 | Comparative Example 2 | Comparative Example 3 | Comparative Example 4 | Comparative Example 5 | Comparative Example 6 |
|---|---|---|---|---|---|---|
| Pretreatment liquid | PT1 | PT1 | PT1 | PT3 | PT4 | PT1 |
| X (mN/m) | 36.9 | 36.9 | 36.9 | 26.5 | 60.1 | 36.9 |
| White ink | W1 | W1 | W5 | W1 | W1 | W1 |
| Y (mN/m) | 34.5 | 34.5 | 48.0 | 34.5 | 34.5 | 34.5 |
| Non-white ink | C5 | C6 | C1 | C1 | C1 | C7 |
| Z1 (mN/m) | 36.5 | 36.0 | 35.2 | 35.2 | 35.2 | 32.3 |
| Z2 (mN/m) | 47.2 | 48.5 | 41.0 | 41.0 | 41.0 | 57.0 |
| Y − Z1 (mN/m) | −2.0 | −1.5 | 12.8 | −0.7 | −0.7 | 2.2 |
| Z2 − Z1 (mN/m) | 10.7 | 12.5 | 5.8 | 5.8 | 5.8 | 24.7 |
| Color development properties of non-white image | C | C | C | C | C | C |

In the printed textile items of Examples 1 to 14, the color development properties of the non-white image were excellent.

Meanwhile, in all of Comparative Examples 1, 2, and 6 that did not satisfy formula 3, Comparative Example 3 that did not satisfy formula 2, and Comparative Examples 4 and 5 that did not satisfy formula 1, the color development properties of the non-white image were not sufficient.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An ink set for textile printing comprising:

a pretreatment liquid that comprises: a polyvalent metal salt, a first water-soluble organic solvent, and a first surfactant;

a white inkjet ink that comprises: a white pigment, first resin particles, and a second water-soluble organic solvent; and a non-white inkjet ink that comprises: a non-white pigment, a pigment dispersant, second resin particles, a third water-soluble organic solvent, and a second surfactant, an amount of the second resin particles relative to a total mass of the non-white inkjet ink being 14% by mass or more, wherein when a surface tension of the pretreatment liquid is termed X, a surface tension of the white inkjet ink is termed Y, a surface tension of the non-white inkjet ink is termed Z1, and a surface tension of a liquid having a composition in which the second surfactant is excluded from the non-white inkjet ink is termed Z2, formula (1), formula (2), and formula (3) shown below are satisfied, $$33\ mN/m \le X \le 50\ mN/m, \quad (1)$$

$$-5\ mN/m \le Y - Z1 \le 10\ mN/m, \text{ and} \quad (2)$$

$$0\ mN/m \le Z2 - Z1 \le 10\ mN/m. \quad (3)$$

2. The ink set for textile printing according to claim 1, further satisfying formula (4) shown below, $$0\ mN/m \le Z2 - Z1 \le 6.5\ mN/m. \quad (4)$$

3. The ink set for textile printing according to claim 1, wherein the second resin particles in the non-white inkjet ink comprise forced emulsifying resin particles in an amount of, relative to the total mass of the non-white inkjet ink, 5% by mass or more.

4. A method for producing a printed textile item comprising:

applying a pretreatment liquid to a fabric;

applying a white inkjet ink using an inkjet method to the fabric to which the pretreatment liquid has been applied; and applying a non-white inkjet ink using an inkjet method to the fabric to which the white inkjet ink has been applied, wherein the pretreatment liquid comprises: a polyvalent metal salt, a first water-soluble organic solvent, and a first surfactant, the white inkjet ink comprises: a white pigment, first resin particles, and a second water-soluble organic solvent, the non-white inkjet ink comprises: a non-white pigment, a pigment dispersant, second resin particles, a third water-soluble organic solvent, and a second surfactant, an amount of the second resin particles relative to a total mass of the non-white inkjet ink being 14% by mass or more, and when a surface tension of the pretreatment liquid is termed X, a surface tension of the white inkjet ink is termed Y, a surface tension of the non-white inkjet ink is termed Z1, and a surface tension of a liquid having a composition in which the second surfactant is excluded from the non-white inkjet ink is termed Z2, formula (1), formula (2), and formula (3) shown below are satisfied, $$33\ mN/m \le X \le 50\ mN/m, \quad (1)$$

$$-5\ mN/m \le Y - Z1 \le 10\ mN/m, \text{ and} \quad (2)$$

$$0\ mN/m \le Z2 - Z1 \le 10\ mN/m. \quad (3)$$

5. The method for producing a printed textile item according to claim 4, further satisfying formula (4) shown below, $$0\ mN/m \le Z2 - Z1 \le 6.5\ mN/m. \quad (4)$$

6. The method for producing a printed textile item according to claim 4, wherein the second resin particles in the non-white inkjet ink comprise forced emulsifying resin particles in an amount of, relative to the total mass of the non-white inkjet ink, 5% by mass or more.

7. The ink set for textile printing according to claim 1, wherein the non-white pigment is dispersed by the pigment dispersant in the non-white inkjet ink.

8. The ink set for textile printing according to claim 1, wherein the second resin particles comprise acrylic-based resin particles.

9. The ink set for textile printing according to claim 1, wherein the amount of the second resin particles relative to the total mass of the non-white inkjet ink is in a range from 14% by mass to 30% by mass.

10. The ink set for textile printing according to claim 1, wherein the second resin particles in the non-white inkjet ink comprise forced emulsifying resin particles in a range, relative to the total mass of the non-white inkjet ink, from 5% by mass to 30% by mass.

11. The ink set for textile printing according to claim 1, wherein the second resin particles in the non-white inkjet ink comprise forced emulsifying resin particles in an amount of, relative to the total mass of the non-white inkjet ink, 10% by mass or more.

12. The ink set for textile printing according to claim 1, wherein the second resin particles in the non-white inkjet ink comprise forced emulsifying resin particles in a range, relative to the total mass of the non-white inkjet ink, from 10% by mass to 30% by mass.

13. The method for producing a printed textile item according to claim 4, wherein the non-white pigment is dispersed by the pigment dispersant in the non-white inkjet ink.

14. The method for producing a printed textile item according to claim 4, wherein the second resin particles comprise acrylic-based resin particles.

15. The method for producing a printed textile item according to claim 4, wherein the amount of the second resin particles relative to the total mass of the non-white inkjet ink is in a range from 14% by mass to 30% by mass.

16. The method for producing a printed textile item according to claim 4, wherein the second resin particles in the non-white inkjet ink comprise forced emulsifying resin particles in a range, relative to the total mass of the non-white inkjet ink, from 5% by mass to 30% by mass.

17. The method for producing a printed textile item according to claim 4, wherein the second resin particles in the non-white inkjet ink comprise forced emulsifying resin particles in an amount of, relative to the total mass of the non-white inkjet ink, 10% by mass or more.

18. The method for producing a printed textile item according to claim 4, wherein the second resin particles in the non-white inkjet ink comprise forced emulsifying resin particles in a range, relative to the total mass of the non-white inkjet ink, from 10% by mass to 30% by mass.

* * * * *